Jan. 9, 1951 O. HORNE 2,537,222
VEHICLE CONTROL
Filed Jan. 19, 1946 3 Sheets-Sheet 1
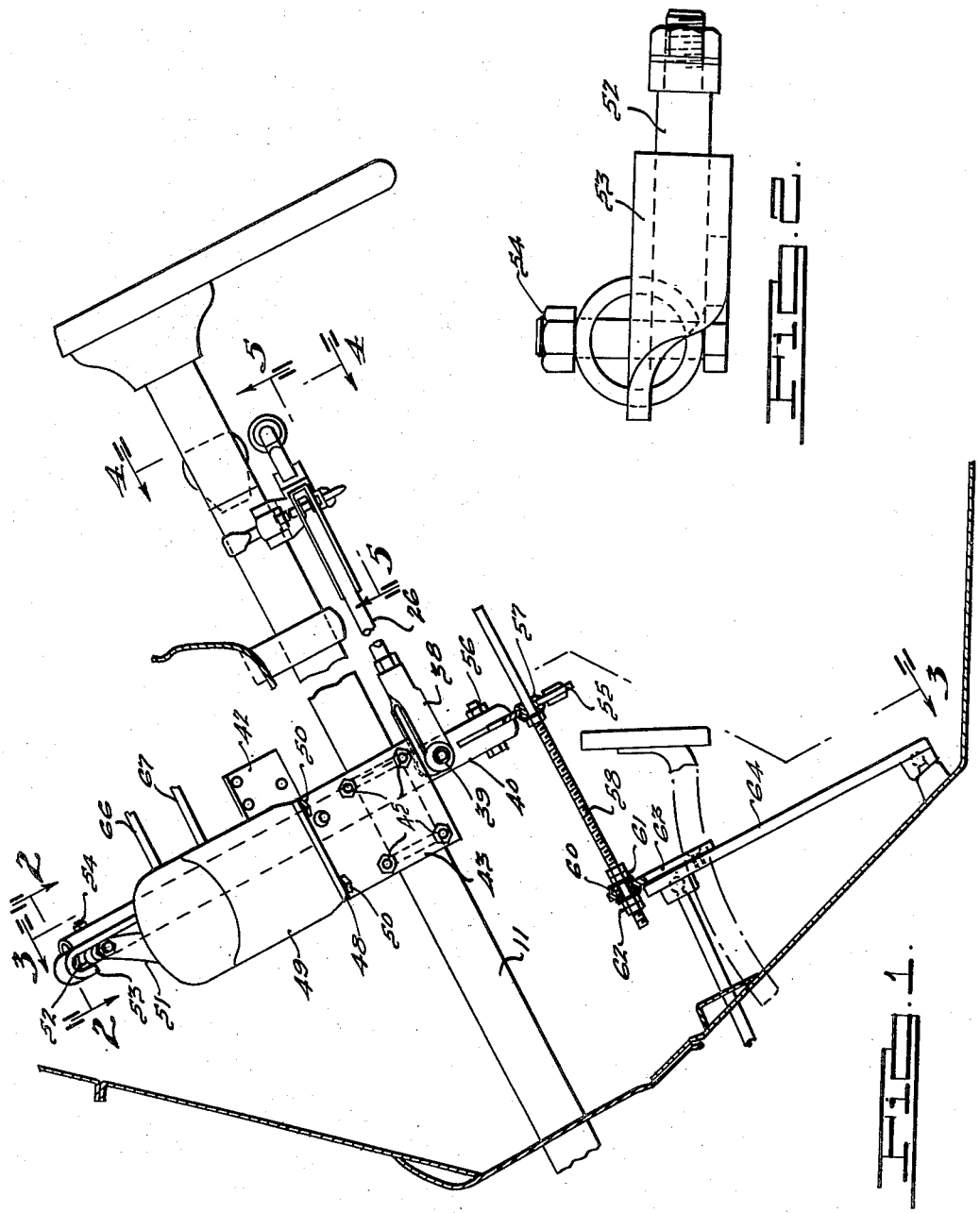
INVENTOR.
Olaf Horne.
BY
Harness and Harris
ATTORNEYS.

Jan. 9, 1951
O. HORNE
2,537,222
VEHICLE CONTROL
Filed Jan. 19, 1946
3 Sheets-Sheet 2
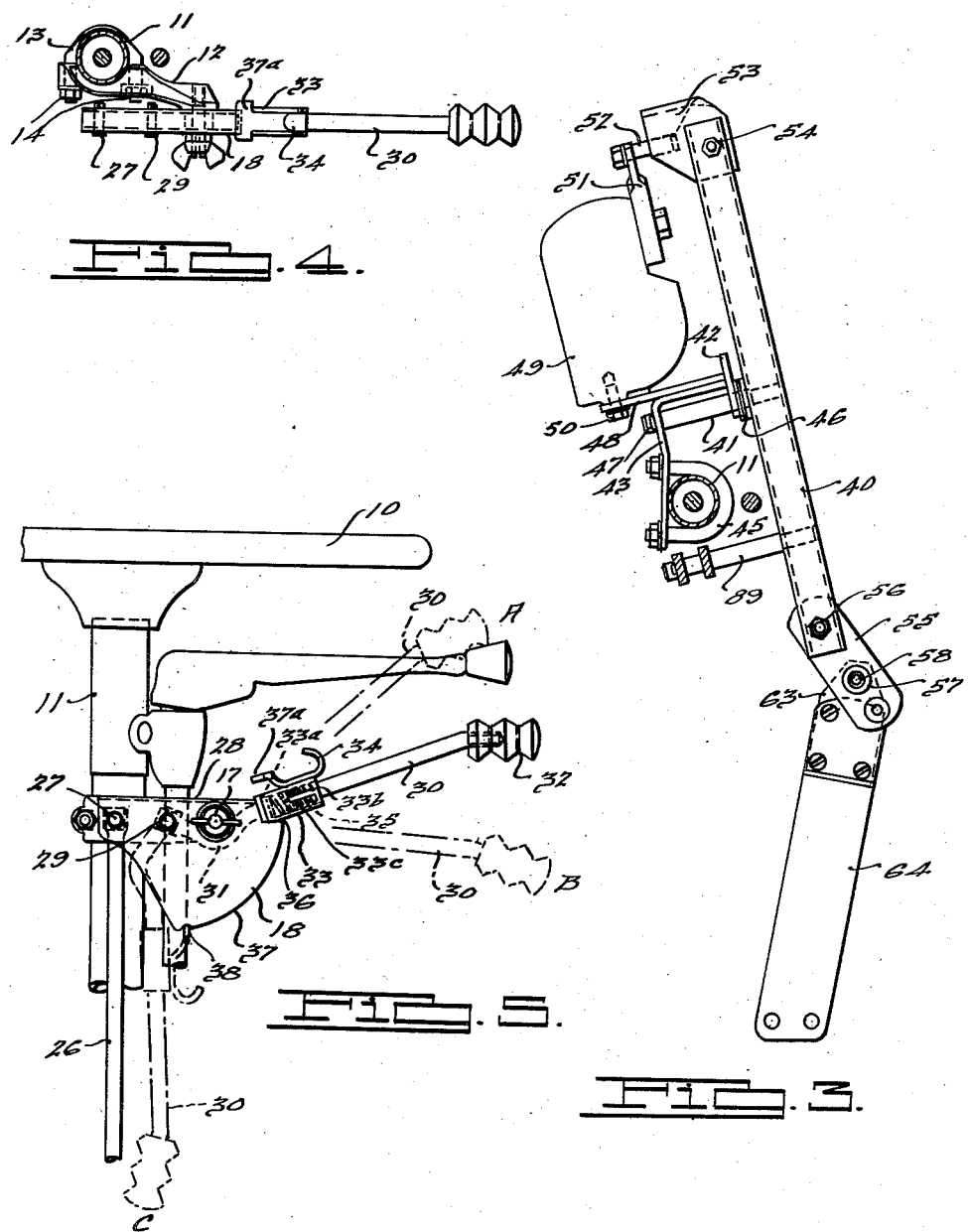
INVENTOR.
Olaf Horne.
BY
Harness and Harris
ATTORNEYS.

Jan. 9, 1951           O. HORNE           2,537,222
VEHICLE CONTROL
Filed Jan. 19, 1946           3 Sheets-Sheet 3
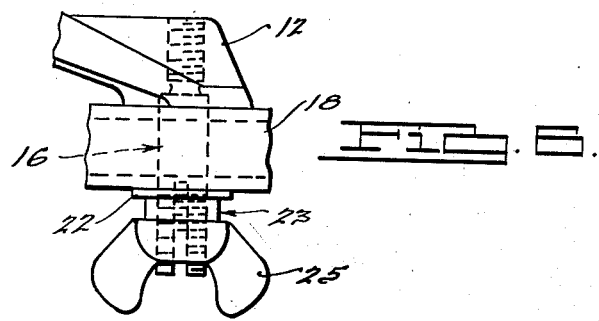
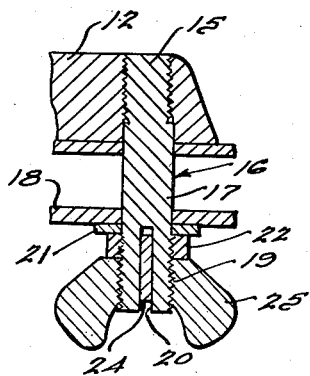
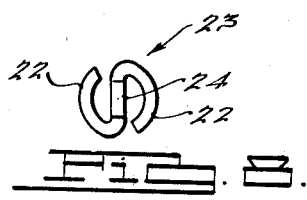
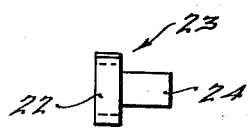
INVENTOR.
Olaf Horne.
BY
Harness and Harris
ATTORNEYS.

Patented Jan. 9, 1951

2,537,222

UNITED STATES PATENT OFFICE 2,537,222

VEHICLE CONTROL

Olaf Horne, Birmingham, Mich., assignor to Chrysler Corporation, Highland Park, Mich., a corporation of Delaware Application January 19, 1946, Serial No. 642,400

10 Claims. (Cl. 74—434)

This application relates to simplified controls for automobiles for the benefit of handicapped drivers and also to various means, which may be useful with such controls.

It has been demonstrated that it is desirable to unify various control devices for an automobile such as brake, clutch, and accelerator so that they may be operated through a single actuating member. I have made improvements in means for connecting the single actuating member with the automobile control devices, in the mounting of the actuating member, and in a lock washer useful in the mounting of the actuating member.

An object of the present invention is to provide improvements in a unitary actuating means for separate automobile control devices such as brake and accelerator.

A further object is to provide an actuating means for automobile controls such as brake and accelerator, which actuating means is easily adjusted between an operative position in which the means is easily available to the driver of the automobile and an inoperative position in which the means is out of the way of a driver who does not wish to employ the means.

Another object is to provide improvements in a lock for a nut having threaded engagement with a member serving as a pivot for a pivoted part.

Other objects will appear from the disclosure.

In the drawings:

Fig. 1 is a view partially in section of a unitary actuating means of the present invention;

Fig. 2 is an end view of a portion of the unitary actuating means, taken on the line 2—2 of Fig. 1;

Fig. 3 is a sectional view taken on the line 3—3 of Fig. 1;

Fig. 4 is a sectional view taken on the line 4—4 of Fig. 1;

Fig. 5 is a sectional view taken on the line 5—5 of Fig. 1;

Fig. 6 is a detail view of a portion of the structure shown in Fig. 4;

Fig. 7 is a sectional view of the said portion of structure shown in Fig. 6; and Figs. 8 and 9 are elevational views of a locking device used in the structure portion shown in Figs. 6 and 7.

As seen in Fig. 5, the reference character 10 designates a steering wheel positioned at the upper end of a steering post 11. A bracket 12 is secured to the steering post 11 by a U-shaped clamp 13 and nuts 14 on the ends of the clamp.

As seen in Figs. 6 and 7, the bracket 12 has a threaded opening engaged by a threaded end 15 of a part 16. This part has an unthreaded central portion 17, which extends through legs of a U-shaped member 18 adjacent the base thereof, thereby providing a pivotal support for the member 18 on the bracket 12. The part 16 has a threaded end 19 provided with an axial slot 20. A washer 21 engages one side of the U-shaped member 18 and is in turn engaged by the arcuate end portions 22 of a locking element 23 shown by itself in Figs. 8 and 9. The element 23 has a planar central portion 24 fitting in the slot 20 in the pivot part 16. A wing nut 25 engages the threaded end portion 19 on the pivot part 16, acting through the arcuate end portions 22 on the locking element 23 and the washer 21 to hold the U-shaped member 18 against the bracket 12. The central portion 24 of the locking element 23 is relatively wide and the end portions 22, relatively narrow, and so the central portion 24 extends through the section of the threaded end 19 engaged by the nut 25. As seen in Fig. 8, the locking element 23 is approximately of S-shape, and the arcuate end portions are curved in the same direction from the planar central portion 24. The locking element 23 transmits holding force of the nut 25 to the member 18, and yet prevents pivotal movement of the member 18 and the washer 21 from causing loosening of the nut 25, for the slot 20 in the pivot part 17 and the planar or straight central portion 24 of the locking element 23 cooperate to prevent rotative movement of the locking element. Engagement of the threaded end 15 of the pivot part 16 with the bracket 12 is sufficiently tight to prevent any rotative movement of the pivot part 16 that might be due to pivoting of the member 18.

A rod 26 is connected by a pin 27 to the member 18 adjacent a base 28 of the member 18 and extends into the member. The pivot part 16 extends through the member 18 adjacent the base 28. Between the pivot part 16 and the pin 27 connecting the rod 26 to the member 18, a pin 29 passes through the sides of the member 18, pivotally connecting one end of an operating lever 30 to the member 18. The lever 30 has a bent portion 31 passing directly beneath the pivot part 17. In the position of Fig. 5 the lever 30 contacts the base 28 of the member 18 and extends outwardly to the right beyond the member 18, terminating in a handle portion 32. A sleeve 33 is mounted upon the lever 30 and carries a hook 34 for moving the sleeve 33 to the right along the lever 30 as viewed in Fig. 5. Such retraction will be carried out against the action of a coil spring 35 positioned between the lever 30 and the sleeve 33 and having one end engaging an internal shoulder 33ª on sleeve 33 and the other end engaging a pin 33ᵇ extending through rod 30 and into elongated slots 33ᶜ at opposite sides of the sleeve 33. The slots cooperate with the pair to prevent angular movement between the sleeve and the lever 30 while permitting axial movement therebetween. Under the action of the spring 35 the sleeve 33 is normally urged far enough to the left on the lever 30 as to engage a shoulder 36 formed on the sides of the U-shaped member 18. Upward movement of the lever 30 with respect to the member 18 is prevented by engagement of the lever 30 with the base 28 of the member 18. Downward movement of the lever 30 with respect to the member 18 is prevented by engagement of the sleeve 33 on the lever 30 with the shoulder 36 on the member 18, for, as shown in Fig. 4, the sleeve 33 cannot pass between the sides of the member 18. Thus with the sleeve 33 in the normal position of Fig. 5, movement of the lever 30 from the full-line position upwardly or downwardly to the dotted-line positions A and B will produce corresponding movement of the member 18, which will take place about the pivot part 17, causing downward or upward movement of the rod 26. When the operating lever 30 is positioned with respect to the member 18 as shown in the full-line position of Fig. 5, the lever 30 is operative. It extends generally at right angles to the steering post 11 with its handle portion only a short distance from the steering wheel 10. The dotted-line position C of Fig. 5 shows the lever 30 inoperative and extending downwardly parallel and in close proximity to the steering post 11 and the rod 26. Here the lever 30 is completely out of the way of a driver who does not choose to use the lever 30. Shift of the lever from the full-line position to position C is made possible by retraction of the sleeve 33 sufficient for the sleeve 33 and a raised wide portion 37ª on the hook 34 to clear the shoulder 36 on the member 18. In the shift of the lever 30 the sleeve 33 may be released and the wide portion 37ª on the hook 34, which projects slightly beyond the left end of sleeve 33, will be urged by the spring into engagement with edges 37 on the member 18. These edges are very generally arcuate about the pin 29 as a center so as to permit shift of the lever 30 in spite of engagement of the portion 37ª with the edges 37. When the lever 30 reaches position C, the portion 37ª moves into a groove 38 formed on edges 37. In this way the lever 30 is retained in position C until the sleeve 33 and hook 34 are again retracted against the action of the spring 35 sufficiently for the portion 37ª to be moved out of groove 38. The lever 30 may then be returned to the full-line position. The edges 37 have been described as very generally arcuate about the pin 29 as a center. Actually the radius of the edges 37 decreases somewhat from the shoulder 36 to the groove 38 so that less retraction is required of the sleeve 33 in position C for return of the lever to full-line position than in full-line position for shift of the lever to position C.

Figs. 1, 2, and 3 show means by which up and down movement of the operating lever 30 and the actuating rod 26 are communicated to the brake, clutch, and accelerator for actuation thereof. The lower end of the actuating rod 26 carries a clevis 38 which is connected to a member 39 fixed to and projecting laterally from a hollow tube 40, which constitutes a lever. The tube or lever is pivoted at an intermediate region by means of a member 41 fixed thereto and projecting therefrom. The member 41 extends through a piece 42 and a bent element 43 secured to the steering post 11 by means of U-bolts 45. The tube or lever 40 is spaced from the part 42 by means of washers 46 and the member 41 is retained in the part 42 and the bent element 43 by means of a cotter pin 47. A plate 43 is suitably secured to the bent member 43 and supports a valve housing 49 by means of screws 50. An arm 51 is mounted on the valve housing 49 and carries a laterally projecting member 52 adapted to be engaged by a hook-shaped part 53. The part 53 fits in a slot in one end of the tube or lever 50 and is secured thereto by means of a bolt and nut 54. A plate 55 fits in a slot in the other end of the tube 40 and is secured thereto by means of a bolt and nut 56. The plate 55 carries a bushing 57 in which is slidably positioned a threaded rod 58. A nut 59 adjustably mounted on the threaded rod 58, engages the under side of the bushing 57, as shown in Fig. 1. The lower end of the threaded rod 58 carries a bushing 60 positioned on the rod by means of pairs of nuts 61 and 62. The bushing 60 is attached to an extension piece 63 riveted to an accelerator pedal 64. A rod 65 extends from the under side of the accelerator pedal 64 so as to be operatively connected to the various devices not shown in the present application, but shown in Auten application Serial No. 642,337, filed January 19, 1946. Lines 66 and 67 are connected to the valve housing 99. Line 66 will be continuously connected to a source of vacuum such as a vacuum storage tank, in a manner not shown, and the other line will lead to one end of a vacuum cylinder connected to a brake also in a manner not shown and may be connected either to the vacuum line 66 or to atmospheric air pressure. When the arm 51 mounted on the valve housing 49 is positioned as shown in Fig. 1, the lines 66 and 67 leading to the valve housing 49 will be connected to one another so that the brake is released. When the brake is to be applied, the arm 51 is moved in a counterclockwise direction from the position of Fig. 1 in order to connect the line 67 to atmospheric air. The required counterclockwise movement of the arm 51 will be brought about by counterclockwise movement of the tube or lever 40 or in other words, leftward movement, as viewed in Fig. 1 of the hook-shaped element 53 attached to the lever 40. As the arm 51 moves in a counterclockwise direction, it enters the hook 53. Thus when the lever 40 is returned to its original position through clockwise movement or in other words, movement to the right as viewed in Fig. 1 of the hook-shaped element 53 takes place, and the engagement of the projecting member 52 on the arm 51 with the hook brings about a clockwise movement of the arm 51 to its original position. When this occurs, the lines 66 and 67 are again connected to one another, and vacuum is supplied to both ends of the vacuum cylinder for the brake, and the brake is released. The aforementioned actuation of the brake will be brought about by upward movement of the actuating rod 26. This may be effected by downward movement of the lever 30.

Depression of the accelerator pedal 64 required for engagement of the clutch and opening of the throttle valve will take place as a result of leftward movement of the end of the tube or lever 50 to which the plate 55 is connected. The plate 55 acts through the bushing 57 and the nut 59 to shift the threaded rod 58 to the left, as viewed in Fig. 1. This movement is communicated to the accelerator pedal 64 through the bushing 60, the nuts 62, and the extension piece 63. Depression of the accelerator pedal 64 is brought about by downward movement of the actuating rod 26 through upward movement of the operating lever 30. When the operating lever is returned to neutral position the bushing 57 of the plate 55 moves away from the nut 59 on the rod 58, but appropriate spring means, not shown, cause the accelerator pedal 64 to rise and to make the nut 59 on the rod 58 follow the bushing 57 and the plate 55. Connection of the rod 65 to the throttle and the clutch is not shown in the present application, but is shown in Auten application, Serial No. 642,337, filed January 19, 1946, now Patent No. 2,523,491.

As aforementioned, rightward movement of the hook-shaped element 53 to its original neutral position will by an engagement of the hook with the projecting member 52 carried by the arm 51 bring about the return of the arm 51 to its neutral position of Fig. 1. However, further movement of the hook-shaped element 53 to the right, occurring as a result of movement to the left of the plate 55 for depression of the accelerator pedal 64, will have no effect upon the arm 51 since the projecting member 52 on the arm 51 has moved out of engagement with the hook-shaped element 53.

I claim:

1. Adjustable means for operating an axially shiftable actuating rod, said means comprising an operating lever therefor extending at right angles to the actuating rod, a U-shaped member having legs receiving between them in pivotal connections an end of the actuating rod and an end of the operating lever, the actuating rod extending generally transversely to the base of the U-shaped member, the distance between the pivot of the lever on the U-shaped member and the edges of the legs of the U-shaped member at one side increasing suddenly at a region slightly spaced from the base of the U-shaped member so as to provide a shoulder and staying very generally the same from the said region to another region generally on a line through the pivot of the operating lever and transverse to the base of the U-shaped member, a sleeve mounted on the operating lever and being too large to fit between the legs of the U-shaped member, resilient means urging the sleeve toward the pivot of the operating lever on the U-shaped member, whereby the operating lever may extend at right angles to the actuating rod and be prevented from moving to a position of parallelism with the actuating rod by engagement of the sleeve with the shoulder, or may extend parallel to the actuating rod, the U-shaped member being provided with means at the said other region so as to be associable with the sleeve for preventing the rod from moving from a position of general parallelism with the actuating rod to a position of transverse relation with the actuating rod.

2. Adjustable means for operating an axially shiftable actuating rod, said means comprising an operating lever therefor extending at right angles to the actuating rod, a U-shaped member having legs receiving between them in pivotal connections an end of the actuating rod and an end of the operating lever, the actuating rod extending generally transverse to the base of the U-shaped member, the distance between the pivot of the operating lever on the U-shaped member and the edges of the legs of the U-shaped member at one side increasing suddenly at a region slightly spaced from the base of the U-shaped member so as to provide a shoulder and staying very generally the same from the said region to another region generally on a line through the pivot of the operating lever and transverse to the base of the U-shaped member and being provided with a groove at the said other region, a sleeve mounted on the operating lever and being too large to fit between the legs of the U-shaped member, resilient means urging the sleeve toward the pivot of the operating lever on the U-shaped member, whereby the operating lever may extend at right angles to the actuating rod and be prevented from moving to a position of parallelism with the actuating rod by engagement of the sleeve with the shoulder, or may extend parallel to the actuating rod and be prevented from moving back to a position of transverse relation with the actuating rod by association of the sleeve with the groove.

3. Adjustable means for operating an axially shiftable actuating rod, said means comprising a U-shaped member, means providing a pivotal mounting for the U-shaped member, means pivotally connecting an end of the actuating rod to the U-shaped member, the actuating rod being received within the U-shaped member and extending generally at right angles to the base of the U-shaped member, an operating lever pivotally connected to the U-shaped member and extending in operative position generally at right angles to the actuating rod and in inoperative position generally parallel to the actuating rod, movement of the operating lever beyond right-angled relation with the actuating rod being prevented by contact of the operating lever with the base of the U-shaped member, and a part movably mounted on the operating lever and being engageable with the U-shaped member to prevent movement of the operating lever from operative position to inoperative position and vice versa, such movement being made possible through retraction of the part along the operating lever sufficient to make the part clear the U-shaped member.

4. The adjustable means for operating an axially shiftable actuating rod specified in claim 4, the edges of the legs of the U-shaped member being generally arcuate about the connection of the operating lever with the U-shaped member as a center and being provided with a shoulder at one end of the arcuate edges engageable with the part on the operating lever so as to determine operative position of the lever and to prevent its movement to inoperative position and vice versa and also provided with a groove at the other end of the arcuate edges engageable with the part on the operating lever so as to determine inoperative position of the lever and to prevent its return to operative position, the radius of the arcuate edges decreasing somewhat from the shoulder to the groove for making it easier to move the operating lever from inoperative position to operative position than vice versa because of the less retraction of the part on the operating lever required to clear the edges of the U-shaped member at inoperative position than at operative position.

5. Adjustable means for operating an axially shiftable actuating rod, said means comprising an operating lever therefor, a pair of plates secured to one another in parallel spaced relation and receiving between them in pivotal connections an end of the actuating rod and an end of the operating lever, the edges of the plates being generally arcuate about the pivot of the operating lever as a center for a considerable angle and having a shoulder at one end of the arcuate portions and a retaining means at the other end of the arcuate portions, a member slidably mounted on the operating lever and being too large to fit between the plates, and means urging the member toward the pivot of the operating lever, whereby the lever may in an operative position extend generally transversely to the actuating rod and be prevented from moving toward a position of parallelism with the actuating rod by engagement of the member with the shoulder, and may in an inoperative position extend generally parallel to the actuating rod and may be prevented from returning to a transverse relation with the actuating rod by engagement of the member with the retaining means, the shifting of the operating lever between operative and inoperative positions being possible only upon movement of the member outward of the lever sufficient to make the member clear the shoulder and the retaining means.

6. Adjustable means for operating an axially shiftable actuating rod, said means comprising a U-shaped member having a shoulder formed in the edges of the legs adjacent the base, arcuate edges extending from the first shoulder, and a groove formed at a region of the arcuate edges spaced from the first shoulder, means providing a pivotal mounting for the U-shaped member adjacent its base, means connecting one end of the actuating rod to the U-shaped member to one side of the pivotal mounting of the U-shaped member, the actuating rod being received between the legs of the U-shaped member and extending generally at right angles to the base thereof, an operating lever pivotally connected to the U-shaped member to the said one side of the pivotal mounting of the U-shaped member on the approximate center of the arcuate edges of the U-shaped member, the operating lever being received between the legs of the U-shaped member and extending past the pivotal mounting of the U-shaped member and terminating in a handle portion to the other side of the pivotal mounting, the operating lever having a bent portion engageable with the pivotal mounting of the U-shaped member, a retractible part mounted on the operating lever so as to be engageable with the shoulder on the edges of the U-shaped member to determine an operative position of the lever in which it extends generally at right angles to the actuating rod and to prevent movement of the lever in one direction to an inoperative position in which it extends generally parallel to the actuating rod, engagement of the bent portion of the operating lever with the pivotal mounting of the U-shaped member occurring in operative position of the lever and preventing movement of the lever in the opposite direction away from inoperative position, the retractible part being engageable with the groove on the arcuate edges of the U-shaped member in inoperative position of the lever so as to prevent movement of the lever to operative position, movement between operative and inoperative positions being possible upon retraction of the retractible part sufficient to cause the part to clear the shoulder and to become disengaged from the groove, the retractible part being engageable with the arcuate edges during movement of the operating lever between operative and inoperative positions.

7. The adjustable means for operating an axially shiftable actuating rod specified in claim 6, the retractible part being a sleeve surrounding the operating lever and carrying a spring urging the retractible part toward the connection of the operating lever with the U-shaped member and a hook for moving the sleeve in the opposite direction.

8. The adjustable means for operating an axially shiftable actuating rod specified in claim 6, the retractible part comprising a sleeve surrounding the operating lever, a spring urging the retractible part toward the connection of the operating lever with the U-shaped member, secured to the sleeve for moving the sleeve in the opposite direction and having a portion spaced from the sleeve and projecting beyond the sleeve toward the pivot of the operating lever so as to be engageable with the arcuate edges in the U-shaped member and with the groove formed thereon.

9. Adjustable means for operating an axially shiftable actuating rod, said means comprising an operating lever therefor extending at right angles to the actuating rod, a pivotally supported member having an angled portion at a first side, means pivotally connecting the actuating rod to the member, the actuating rod extending generally transversely to the angled portion of the member, the operating lever having a pivotal mounting to the member, said member further having on a second side thereof a generally arcuate portion provided with shoulder-forming means arranged whereby the distance between the pivotal mounting of the operating lever to the member and the second side increases suddenly at a region slightly spaced from the angled portion of the member to provide a shoulder and stays very generally the same along the edges of the arcuate portion from the said region to another region generally on a line through the pivot of the operating lever and transverse to the angled portion of the member, and a portion forming engageable means at said other region, a part mounted movably to the operating lever so as to be shiftable therealong, said part extending laterally sufficiently to engage the second side of the member and being retractible from engagement with the second side by appropriate shift along the operating lever, and resilient means urging the part along the lever toward the pivotal mounting of the operating lever to the member whereby the operating lever may be prevented from moving from the position at right angles as respects the actuating rod to a position of parallelism as respects the same by engagement of the part with the shoulder and prevented from returning to the position at right angles as respects the actuating rod from the position of parallelism as respects the same by engagement of the part with the engageable means at the said other region, the radius of the arcuate edges decreasing somewhat from the shoulder at the first named region to the engageable means at the other region for making it easier to move the operating lever from the position of parallelism to the right angles position than vice versa because of the less retraction of the part along the operating lever required to clear the arcuate portion at the said other region than at the first named region.

10. Adjustable means for operating an axially shiftable actuating rod, said means comprising an operating lever therefor extending at right angles to the actuating rod, a pivotally supported member having an angled portion at a first side, means pivotally connecting the actuating rod to the member at a point spaced from the point of pivotal support of the latter, the actuating rod extending generally transversely to the angled portion of the member, the operating lever having a pivotal mounting to the member in spaced relation to each of the aforesaid two spaced pivotal points thereon, said member further having on a second side thereof a generally arcuate portion provided with shoulder-forming means arranged whereby the distance between the pivotal mounting of the operating lever to the member and the second side increases suddenly at a region slightly spaced from the angled portion of the member to provide a shoulder and stays very generally the same along the edges of the arcuate portion from the said region to another region generally on a line through the pivot of the operating lever and transverse to the angled portion of the member, and a portion forming engageable means at said other region, a part mounted movably to the operating lever so as to be shiftable therealong, said part extending laterally sufficiently to engage the second side of the member and being retractible from engagement with the second side by appropriate shift along the operating lever, and resilient means urging the part along the lever toward the pivotal mounting of the operating lever to the member whereby the operating lever may be prevented from moving from the position at right angles as respects the actuating rod to a position of parallelism as respects the same by engagement of the part with the shoulder and prevented from returning to the position at right angles as respects the actuating rod from the position of parallelism as respects the same by engagement of the part with the engageable means at the said other region, the radius of the arcuate edges decreasing somewhat from the shoulder at the first named region to the engageable means at the other region for making it easier to move the operating lever from the position of parallelism to the right angles position than vice versa because of the less retraction of the part along the operating lever required to clear the arcuate portion at the said other region than at the first named region.

OLAF HORNE.

REFERENCES CITED

The following references are of record in the file of this patent:

UNITED STATES PATENTS

| Number | Name | Date |
| --- | --- | --- |
| 455,728 | Norton | July 7, 1891 |
| 1,387,096 | Benson | Aug. 9, 1921 |
| 1,524,898 | Whiter | Feb. 3, 1925 |
| 1,715,902 | Countryman | June 4, 1929 |
| 2,212,904 | Stone | Aug. 27, 1940 |
| 2,281,143 | Dickerson | Apr. 28, 1942 |

Certificate of Correction

Patent No. 2,537,222 January 9, 1951

OLAF HORNE

It is hereby certified that error appears in the printed specification of the above numbered patent requiring correction as follows:

Column 6, line 52, for the claim reference numeral "4" read *3*;

and that the said Letters Patent should be read as corrected above, so that the same may conform to the record of the case in the Patent Office.

Signed and sealed this 6th day of March, A. D. 1951.

[SEAL]

THOMAS F. MURPHY,
*Assistant Commissioner of Patents.*